(12) United States Patent
Pena et al.

(10) Patent No.: US 8,971,064 B2
(45) Date of Patent: Mar. 3, 2015

(54) ELECTRICITY GENERATING INSTALLATION PROVIDED WITH MEANS FOR STORAGE OF ENERGY AND CONTROL PROCESS FOR AN INSTALLATION OF THIS TYPE

(71) Applicant: GE Energy Products France SNC, Belfort (FR)

(72) Inventors: Ezio Pena, Cravanche (FR); Jean-Louis Vignolo, Valdoie (FR); Jean Marc Ingremeau, Montbeliard (FR); Rahul J. Chillar, Atlanta, GA (US); Frederic Chevalier, Thiancourt (FR); Herve Biellmann, Eloie (FR); Maxime Buquet, Belfort (FR); Julien Guyot, Belfort (FR)

(73) Assignee: GE Energy Products France SNC, Belfort (FR)

( * ) Notice: Subject to any disclaimer, the term of this patent is extended or adjusted under 35 U.S.C. 154(b) by 222 days.

(21) Appl. No.: 13/679,877

(22) Filed: Nov. 16, 2012

(65) Prior Publication Data

US 2013/0127164 A1    May 23, 2013

(30) Foreign Application Priority Data

Nov. 18, 2011  (EP) .................................... 11306522

(51) Int. Cl.
*H02J 3/28*    (2006.01)
*G05F 1/10*    (2006.01)
(Continued)

(52) U.S. Cl.
CPC ... *G05F 1/10* (2013.01); *F02C 1/00* (2013.01); *F02C 6/14* (2013.01); *H02J 3/30* (2013.01);
*H02J 9/066* (2013.01); *Y02E 60/16* (2013.01); *Y02B 10/72* (2013.01); *Y02T 50/672* (2013.01)
USPC ............................................. 363/34; 290/1 R

(58) Field of Classification Search
CPC ..................................... H02J 3/30; F02C 6/14
USPC ......................................................... 290/1 R
See application file for complete search history.

(56) References Cited

U.S. PATENT DOCUMENTS

| 4,001,666 A | 1/1977 | Grenfell |
| 5,256,907 A | 10/1993 | Shimada et al. |

(Continued)

FOREIGN PATENT DOCUMENTS

| DE | 3829457 A | * | 3/1990 |
| EP | 359027 A1 | | 8/1989 |

(Continued)

OTHER PUBLICATIONS

PCT Search Report and Written Opinion dated Feb. 7, 2014, issued in connection with corresponding WO Application No. PCT/IB2012/002861.

*Primary Examiner* — Joseph Waks
(74) *Attorney, Agent, or Firm* — GE Global Patent Operation; Mark A. Conklin

(57) ABSTRACT

An electricity generating installation includes an electricity generation unit of a gas turbine, steam turbine or combined-cycle type, wherein the electricity generation unit is coupled to a generator and is connected to a distribution network, an energy storage unit configured to store kinetic energy and electrical energy, and a standby electricity generation unit. The installation further includes a controller configured to manage the operation of the energy storage unit and configured to manage the connection of the energy storage unit to the electricity generation unit and to the network. The controller receives a series of information originating from the network, the energy storage unit, the electricity generation unit and a network operator in order to control the generation of electricity to be delivered to the network and to auxiliary systems of the installation from the energy storage unit.

21 Claims, 4 Drawing Sheets

(51) Int. Cl.
*F02C 1/00* (2006.01)
*F02C 6/14* (2006.01)
*H02J 3/30* (2006.01)
*H02J 9/06* (2006.01)

(56) References Cited

U.S. PATENT DOCUMENTS

| | | | |
|---|---|---|---|
| 6,134,124 A * | 10/2000 | Jungreis et al. | 363/34 |
| 6,160,336 A * | 12/2000 | Baker et al. | 310/74 |
| 6,169,390 B1 * | 1/2001 | Jungreis | 322/4 |
| 6,184,593 B1 * | 2/2001 | Jungreis | 307/64 |
| 7,302,320 B2 * | 11/2007 | Nasr et al. | 701/22 |
| 7,411,308 B2 * | 8/2008 | Parmley | 290/1 R |
| 7,573,144 B1 | 8/2009 | Saban et al. | |
| 2004/0263116 A1 | 12/2004 | Doruk et al. | |
| 2005/0035744 A1 * | 2/2005 | Potter et al. | 322/4 |
| 2005/0077881 A1 * | 4/2005 | Capp et al. | 322/29 |
| 2011/0175443 A1 | 7/2011 | Koyanagi et al. | |

FOREIGN PATENT DOCUMENTS

| | | | |
|---|---|---|---|
| JP | 2003274562 | | 9/2003 |
| JP | 2003339118 | | 11/2003 |
| JP | 2006238684 A | * | 9/2006 |
| JP | 2011152013 A | * | 8/2011 |
| JP | 2011182516 A | | 9/2011 |
| JP | 2013110956 A | * | 6/2013 |
| WO | 0193410 A1 | | 12/2001 |
| WO | 0244555 | | 6/2002 |
| WO | WO 0244555 A1 | * | 6/2002 |
| WO | 2005029667 | | 3/2005 |
| WO | 2006094128 | | 9/2006 |

* cited by examiner

ELECTRICITY GENERATING INSTALLATION PROVIDED WITH MEANS FOR STORAGE OF ENERGY AND CONTROL PROCESS FOR AN INSTALLATION OF THIS TYPE

BACKGROUND OF THE INVENTION

Embodiments of the invention relate, in general, to electricity generating installations and, specifically, to gas turbine or combined-cycle power plants in which a gas turbine and a steam turbine are used in combination to drive a generator for the production of electricity.

Existing electricity generating installations generally involve the use of large-scale hydroelectric, nuclear or fossil fuel-fired power plants which supply electricity via transmission and distribution systems.

Targets for the reduction of $CO_2$ emissions set by numerous countries will lead to an increase in the proportion of power generation from renewables which, for example, will reach 35% in Germany and 20% in France by 2020. In addition to improvements in efficiency, conventional electricity supply facilities will be required to show greater flexibility and responsiveness in the interests of their optimized operation, and will need to accommodate a wider variety of intermittent power sources, such as wind turbines, solar power plants and other facilities, such as wave-powered, geothermal or biomass plants. This diversification, and the associated increase in the number of production sources, will pose a considerable challenge to network management and electricity distribution systems.

Existing electricity production facilities and distribution networks were not designed to accommodate these changes and, as a result, are ill-suited to the fulfillment of these new requirements in the long term, in the absence of substantial investments for this purpose.

Electricity production from renewables at this level increases the complexity of electricity distribution systems and networks, resulting in fluctuations in energy supply conditions which will need to be carefully managed. In the absence of advanced control, there is a risk that distribution systems will operate inefficiently, or will be subject to frequent disturbances.

From the viewpoint of electricity suppliers and distribution system operators, potential solutions are as follows: the increased flexibility of conventional power plants; the introduction of energy storage technologies designed for use at all levels, as a means of offsetting peaks in demand and allowing the incorporation of a greater number of renewable energy sources; the introduction of more flexible distribution methods as a means of accommodating fluctuations in supply, improving efficiency and optimizing system operation; and the introduction of high-efficiency forecasting, monitoring and control systems, as a means of countering any disturbances.

Disturbances which are liable to ensue from the planned modification of electricity sources and distribution networks may result in power outages (power cuts), i.e. the short-term or long-term loss of electricity within a given zone, associated with faults on power plants, damage to the distribution system (electricity transmission lines or substations), a short-circuit or overload on the electricity network.

Specifically, a "blackout", or network outage, is a particularly critical issue for public safety, hospitals, sewage treatment plants, mines, etc. Other critical systems, such as telecommunication systems, must also be provided with an emergency power source. For this reason, installations are provided with standby generators, which will start up automatically in case of an interruption in electricity supply.

The occurrence of faults on an electricity network in proximity to a power plant of the gas turbine, steam turbine or combined-cycle type may also generate disturbances, or may even result in the shutdown of the power plant concerned.

Moreover, an electricity generating plant taps electricity from the network in order to initiate the run-up of turbine speed, using a generator operating in motor mode, and for the supply of power to the auxiliary systems of the power plant. These power plants must also be provided with standby power supply facilities, such as batteries or diesel engines, in order to accommodate micro-outages of several seconds' duration, or to ensure the completion of normal shutdown and, where applicable, restarting in case of the loss of the network.

Energy storage facilities distributed throughout the network may be used for the regulation of frequency variations, the rapid adjustment of electricity supply to meet demand, the accommodation of highly fluctuating levels of production from power plants using renewable energy sources, and the supply of standby electricity following a power outage.

The function of frequency control is also intended to reduce frequency deviations on networks. Frequency deviations result from imbalances between electricity supply and demand, which may occur at any time during normal operation of the system, or further to an incident such as a loss of production. In Europe, the nominal frequency is set at 50.00 Hz. The minimum instantaneous frequency is set at 49.2 Hz and the maximum instantaneous frequency is set at 50.8 Hz. This corresponds to a frequency deviation of 800 mHz, the maximum permissible dynamic deviation in the nominal frequency (ENTSO-E 2009). In practice, instantaneous frequency ranges are larger, ranging from 46 Hz to 52.5 Hz.

There are three levels of frequency control, namely, primary control, secondary control and tertiary control.

Under rated operating conditions, power plants are required to maintain a reserve capacity for the purposes of a primary frequency control response. In Europe, this reserve capacity may vary from country to country. For example, this reserve capacity is +/−2.5% in France and +/−1.5% in Spain.

The deployment of the primary reserve capacity is initiated before the deviation from the nominal frequency exceeds 200 mHz, within a time interval of 30 seconds and for a maximum duration of 15 minutes.

Accordingly, energy storage means may also be used as a means of contributing to frequency control, in continuous duty and with a rapid response capability.

Finally, it is necessary to regulate any voltage-current phase difference by means of reactive power control. System loads which incorporate windings have a magnetizing effect, resulting in the generation of reactive power. Although the latter delivers no work, in vectorial combination with the active power (chargeable capacity), it constitutes the apparent power which defines the total energy circulating on the network, and also dictates the dimensioning of installations. By optimizing the power factor, it is possible to reduce network losses, maximize the active power flow (or reduce the dimensioning of installations) and enhance stability. Here again, energy storage means may be used for the regulation of this phase difference.

Storage means may also provide the energy sources required for the start-up of power plants (absorption of peaks in capacity, etc.), preventing any micro-outages which are prejudicial to the continuous supply required by hospitals, data processing centers and the standby systems of nuclear power plants.

Kinetic energy or flywheel storage means are applied in this context. These systems, which are comparable to a mechanical battery, involve the rotation of a flywheel (of carbon fiber, other composite materials, steel, etc.) up to a speed of several tens of thousands of r.p.m., connected to a motor/generator. These systems can store/release any surplus/deficit of electricity on the network at any given time, in the form of kinetic energy ($E_k$) which is recovered by the acceleration/deceleration of the flywheel mass. The energy stored/released is given by the following formula:

$$E_k = \frac{1}{2} \cdot j \cdot \omega^2,$$

where 1 is the moment of inertia (in kg·m$^2$) and ω is the angular speed (in rad.s$^{-1}$).

In order to prevent friction losses, these storage systems are supported by magnetic bearings and are enclosed in vacuum housings. They are also provided with power electronics, such as a rectifier-inverter combination, for the purposes of the control of the signal injected/extracted into/from the network and, specifically, for the control of the power factor (cos φ).

This technology is used, amongst other applications, for frequency control, as a solution for the provision of an uninterruptible power supply, for the optimization of energy supply in on-board systems, and in fields such as electricity distribution, aerospace, motor vehicles (for the recovery of kinetic energy from braking), the rail industry, etc.

In the context of electricity distribution and the stability of electricity networks, these storage systems are highly advantageous, as they have a response time of less than one second, a service life of some twenty years, and require little maintenance. Moreover, unlike batteries, they have no "memory effect", are not susceptible to variations in temperature, and permit the precise evaluation of their state of charge. Finally, they do not involve any recycling, and require no particular operating precautions.

At present, by way of reference, some devices of this type currently on the market have a mechanical efficiency in excess of 95% and an overall efficiency (for a complete charging/discharging cycle) of 85%. Some devices can achieve a storage capacity of 25 kWh, deliver an instantaneous capacity of 250 kW and undergo over 150,000 complete charging/discharging cycles.

Systems of various types for the prevention of interruptions in electricity supply, and for the control of frequency and power, are known from the prior art.

In this regard, reference may be made to documents EP 1 900 074 and EP 1 866 717 which describe supply systems of various types for the accommodation of peaks in consumption and the prevention of interruptions in service.

Specifically, document EP 1 866 717 recommends the use of a mini-network, comprising one or more electricity production sources and one or more independent system loads, which may be connected to the network in response to a disturbance.

The documents US 2005-0035744, EP 1 656 722, EP 359 027, U.S. Pat. No. 5,256,907, WO 2002-44555, U.S. Pat. No. 4,001,666 and JP 2003-274562 describe the use of flywheels.

Reference may also be made to document US 2004-0263116, which describes an intelligent energy distribution/storage system for demand-side capacity management. A device is used for the storage of energy in proximity to the point of use or point of production. Document JP 2003-339118 describes a distributed energy supply system comprised of a wind turbine, a photovoltaic generating unit, an energy storage unit, a flywheel and a charging unit.

In consideration of the above, embodiments of the present invention propose a control process for an electricity generating plant of the gas turbine or combined-cycle type, which counters the above mentioned disadvantages.

A gas turbine/steam turbine or combined-cycle power plant generates electricity directly. During start-up, however, the power plant is dependent upon electricity from the network for the supply of power to the generator in motor mode (in the case of a gas turbine), and for the supply of power to auxiliary systems required to power lubrication systems, fuel supply systems, cooling systems, heating and condenser blow-down systems, many of which are comprised of motor-driven pump units and motor-driven fans, valves, etc.

These facilities must be provided with a redundant power supply, in case of the loss of the network or a fault on the latter.

As indicated above, a number of electricity storage means are currently available which will ensure the operation or shutdown of electricity generating plants, such as gas turbine/steam turbine power plants and combined-cycle power plants. These means can be used for the purposes of load transfer, for the supply power to of pumps, fans or cabinets in case of a network or power plant fault, and for the delivery of a low and medium voltage supply for batteries.

In case of a network outage, or "blackout", standby generating means must be provided which will allow h.v. and m.v. auxiliary systems to complete the shutdown of the shaft line and/or the start-up of the generator in safety mode, where applicable.

Typically, these means are comprised of diesel engines, some of which are redundant, which must be maintained in a pre-heated and pre-lubricated condition at all times, in order to be ready for start-up. Moreover, as a safety measure, these engines must undergo regular start-up tests.

Investments for the acquisition, installation, supply and conditioning of these storage and production facilities are considerable, given that they may be subject to only sporadic use.

Moreover, the progressive deterioration of batteries over time may generally be assumed, given that this deterioration is associated with each charging and discharging cycle (hysteresis).

A further problem is the response time of these storage and production means, and limiting this response time would restrict the impact of the fault concerned upon the network and the power plant.

BRIEF DESCRIPTION OF THE INVENTION

According to an embodiment of the present invention, an electricity generating installation is provided. The installation comprises an electricity generation unit of a gas turbine, steam turbine or combined-cycle type, wherein the electricity generation unit is coupled to a generator and is connected to a distribution network, an energy storage unit configured to store kinetic energy and electrical energy, and a standby electricity generation unit. The installation further comprises a controller configured to manage the operation of the energy storage unit and configured to manage the connection of the energy storage unit to the electricity generation unit and to the network. The controller receives a series of information originating from the network, the energy storage unit, the electricity generation unit and a network operator in order to control the generation of electricity to be delivered to the network and to auxiliary systems of the installation from the energy storage unit.

According to another embodiment of the present invention, a control process for an electricity generating installation is provided. The electricity installation comprises an electricity generation unit of a gas turbine, steam turbine or combined-cycle type, wherein the electricity generation unit is coupled to a generator and is connected to a distribution network, an energy storage unit, and a controller configured to manage the operation of the energy storage unit, and configured to manage the connection of the energy storage unit to the electricity generation unit and to the network. The process comprises receiving a series of information originating from the network, the energy storage unit and the electricity generation unit, controlling the generation of electricity for delivery to the network and to auxiliary systems of the installation from the energy storage unit based on the series of information, controlling the energy storage unit for the sequential execution of different functions, and maintaining an optimum state of charge between two functions.

BRIEF DESCRIPTION OF THE DRAWINGS

Further objects, features and advantages of the invention will become apparent from the following description, which is provided by way of example only, and not by way of limitation, with reference to the attached diagrams in which.

DETAILED DESCRIPTION OF THE INVENTION

Figure 1:
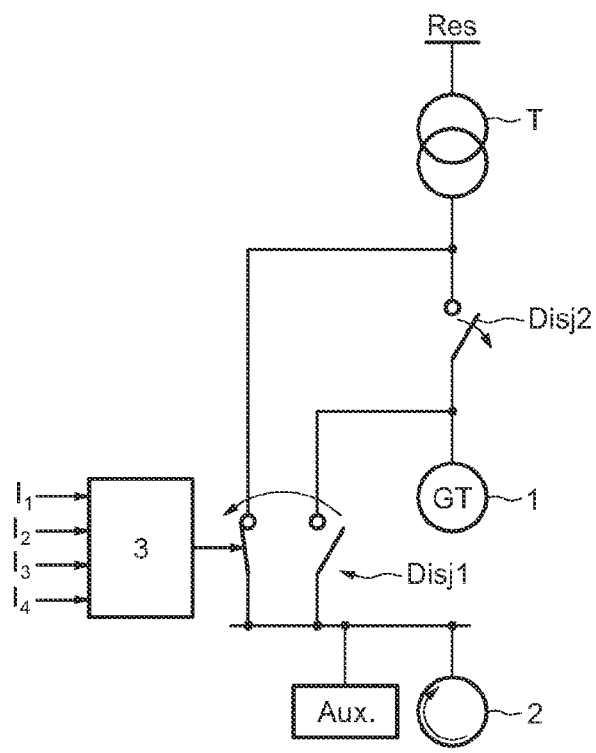
FIG. 1 shows a schematic view of an electricity generating installation according to an embodiment of the invention, provided with means for the storage of electrical energy.

According to one embodiment of the present invention an electricity generating installation and a control process for an installation of this type are provided, using an energy storage means of the flywheel type to deliver the following functions: frequency and voltage control (under steady-state and transient conditions); accommodation of network micro-outages; maintenance of an optimum state of charge of the storage means concerned, in case of a power cut; use of energy stored in mechanical form to support power plant shutdown (including the limitation of the shaft overspeed phenomenon); support for power plant start-up in case of a prolonged network outage; passive or active compensation of harmonics generated by the various power electronic components of means for the generation of power from renewables, and by flywheel energy storage means.

In the light of the above, embodiments of the present invention improve the responsiveness, the flexibility and the operational reliability of electricity generating plants connected to networks with the above mentioned characteristics.

More specifically, embodiments of the present invention provide an electricity generating installation, comprising means for the generation of electricity which are designed for connection to a distribution network which incorporates means for the storage of electrical energy.

This installation also comprises a controller for the management of the operation of the means for energy storage and the connection of the means for storage to the said means for generation and/or to the said network, in order to maximize the use thereof. The controller receives a series of information originating from the network, the means for energy storage, the means for the generation of electricity and the network operator in order to control the production of electricity to be delivered to the network and to the auxiliary systems of the installation from the means for energy storage.

Accordingly, the controller is capable of receiving information from the network (voltage, frequency, demand for the increase or reduction of active or reactive power) and is thus provided with means for the management of the charging and discharging of the means for energy storage, in order to ensure the sequential execution of a number of functions whilst maintaining, a priori, an optimum level of charge (partial or maximum) for the execution of each of these functions.

The incorporation of means for storage permits the use thereof as a support resource for response to peaks in current demand associated with the start-up of the gas turbine. The means for storage will allow a reduction in the rated capacity, or even the elimination of redundancy in the electric generator sets required for start-up.

Upon start-up, load demand is generated by the start-up of auxiliary systems. The means for energy storage permit the smoothing of demand for active power. In this case, the controller must ensure the maximum charging of the means for energy storage between peaks in load demand, thereby allowing the start-up system to be dimensioned with a nominal response capability which is lower than that which would be dictated by peaks in load demand. For example, the start-up system may be dimensioned in accordance with a linear power characteristic, with a constant ramp.

The controller can also detect a sudden drop in the network voltage or power plant voltage under a threshold value, below which the auxiliary systems will no longer operate correctly.

According to a further characteristic of the installation, the controller is capable of regulating the level of primary reserve capacity available in the installation, on the basis of the energy available in the means for energy storage.

According to yet a further characteristic, the controller is capable of controlling the supply of electricity to the network from the means for energy storage, in response to a request by the network operator.

The controller may be capable of contributing towards frequency control on the network, at the request of the network operator and subject to the energy available in the means for energy storage.

The controller may also be capable of controlling the supply of electricity to the auxiliary systems of the power plant from the means for energy storage, in case of a voltage drop of predetermined duration.

For example, where the means for the generation of electricity are comprised of a generator connected to a gas turbine or a steam turbine, the controller is capable of initiating the charging of the means for energy storage, upon the shutdown of the means for the generation of electricity, from the inertia of a shaft line in the means for the generation of electricity.

In an embodiment, the controller is capable of regulating the level of active and/or reactive power to be delivered to the network from the energy available in the means for energy storage.

For example, the means for energy storage comprise a combination of at least one flywheel connected to a motor/generator and/or a series of batteries.

In order to maintain the rotation of the flywheel, a series of auxiliary electric power sources may be used, e.g. of the battery or renewable energy type, connected to their associated power electronic components and capable of maintaining the rotation of the charged flywheel.

For example, the means for energy storage comprise power electronic components for the regulation of current, voltage and frequency in the means for storage.

According to another embodiment of the present invention a control process for an electricity generating installation is provided. The electricity generating installation comprises means for the generation of electricity which are designed for connection to a distribution network, and comprising means for the storage of electrical energy and a controller for the management of the operation of the means for energy storage and the connection of the means for storage to the said means for generation and to the said network.

According to one characteristic of this process, the generation of electricity for delivery to the network and to the auxiliary systems of the installation is controlled by reference to the means for energy storage, and by reference to a series of information originating from the network, the means for energy storage and the means for the generation of electricity, and the means for storage are controlled for the sequential execution of different functions, whilst maintaining an optimum state of charge between two functions.

According to an embodiment, the level of primary reserve capacity available in the installation is regulated on the basis of the energy available in the means for energy storage.

The energy delivered to the network by the means for storage is advantageously comprised of the difference between the energy demand notified by a distribution network operator and the energy supplied by the means for the generation of electricity, limited by the inertia of the gas turbine and the steam turbine.

For example, the network frequency is regulated, at the request of a distribution network operator, using the energy available in the means for energy storage.

According to an embodiment, where the means for the generation of electricity are comprised of a generator connected to a gas turbine or a steam turbine, the means for energy storage are charged, during the shutdown phase of the means for the generation of electricity, from the inertia of the shaft line in the means for the generation of electricity.

The means for energy storage may be capable of supporting the start-up of the installation, thereby limiting any current demand on networks or electric generator sets further to a network outage.

For example, the means for energy storage are capable of supporting the shutdown of the means for the generation of electricity by supplying power to the auxiliary systems of the latter.

According to a further embodiment, the controller detects/receives information on a voltage drop in the network, and supplies electricity to the auxiliary systems of the power plant from the means for energy storage.

It is possible to contribute to maintaining the voltage on the network, and electricity is supplied to the power plant auxiliary system from the means for energy storage in case of a voltage drop of a predetermined duration on the network.

It is also possible to regulate the level of active and/or reactive power to be delivered to the network using the energy available in the means for energy storage.

With reference to FIG. 1, the architecture of an electricity generating installation according to embodiments of the present invention will be described.

As indicated in FIG. 1, which shows a schematic representation of part of a gas turbine or combined-cycle electricity generating plant, an electricity generating installation of this type comprises a generating unit 1, for example, a gas turbine, coupled to a generator and connected to a distribution network Res via a transformer T.

During the normal operation of the power plant, the generating unit delivers electric power to the network. During start-up, the generator functions in motor mode and taps electricity from the network to drive the turbine.

The installation is also provided with auxiliary systems Aux, of various types, for the execution of ancillary functions, specifically motor-driven lubrication pumps and motor-driven cooling fans, turbine fuel supply systems and a series of valves, etc.

The installation is also provided with means 2 for the storage of energy in the form of kinetic energy (kinetic energy storage system or KESS). For example, but not by way of limitation, such means 2 are provided in the form of a unit comprised of at least one flywheel, consisting, for example, of wheels of carbon fiber, composite material or steel construction, etc., rotated by the action of a motor/generator which is supplied with current from the network, and capable of converting the kinetic energy of the flywheel into electrical energy, and also capable of converting the kinetic energy generated by the rotation of the generator into electricity for the recharging of the means for storage 2.

It will be seen that the auxiliary systems and the means for energy storage are connected between the transformer and the generating unit via circuit-breakers Disj1, which are controlled by a controller 3. As described in greater detail hereafter, the controller is connected to the main elements of the installation and to the network Res, specifically for the retrieval of information on the operation of the network and the installation. The controller incorporates all the requisite software and hardware, and is programmed appropriately for the control of the charging and discharging of the means for energy storage in accordance with the information retrieved, and for the initiation of sequential charging and/or discharging phases required for the execution of control functions pertaining to the operation of the installation.

A further circuit-breaker Disj2 is also provided between the transformer T and the generating unit 1.

The controller manages the operation of the means for kinetic energy storage, thereby ensuring the execution of various functions required to ensure the reliability and flexibility of the power plant in response to events on the network.

The management process deployed by the controller is also designed to expand the functionalities of KESS-type means for energy storage to include functions which, hitherto, have been specific to the power plant. Specifically, the controller is designed to call up the means for energy storage in fulfillment of the primary reserve capacity (total or partial), specifically during the first seconds of additional load demand, in order to offset the limitation of the power plant capacity run-up imposed by the acceleration of the gas turbine, the inertia of the steam cycle and the various constraints incumbent upon the power plant.

This reserve capacity is dictated by the network operator. In this case, the gas turbine/steam turbine or the combined-cycle may be required to reduce its working point to a figure as low as 95% (depending upon the country concerned) or to operate as a peak load facility, where additional capacity is required.

It should be observed that the functions delivered by the means of storage are executed sequentially, whereby the controller ensures the optimum charging of the means for energy storage between two functions, and maintains an optimum and prerequisite charging status for each of the functions to be executed.

The process deployed by the means for storage which are managed by the controller is compatible with the use of these means for storage on a sporadic basis, and permits the transfer of a function delivered by the gas turbine to the said means for storage, thereby maximizing the utilization of this resource.

Conversely to solutions known from the prior art, in which no specific distinction is drawn between the use of batteries and the use of kinetic storage means, KESS-type systems have substantial advantages over batteries in terms of charging and recharging characteristics, and the absence of hysteresis.

The incorporation of KESS-type means for energy storage 2 in an electricity generating plant will permit the more effective accommodation by the latter of incidents on the network, namely: a substantial voltage drop, or the loss of the network (described by the term "blackout").

KESS-type means for energy storage can also function in place of the power plant for the delivery of the primary reserve capacity, or can support the power plant start-up by eliminating peaks in current demand associated with the start-up of recirculation pumps or the start-up of the generator. In practice, KESS-type means for energy storage 2 will permit the smoothing of active power demand required for the purposes of start-up.

The invention therefore proposes a means for the maximum utilization of KESS-type means for energy storage 2 coupled to a gas turbine or combined-cycle power plant.

As will be seen from FIG. 1, the controller receives, at its input, a series of information I1 originating from the network Res.

The controller also receives information I2 associated with the operation of the means for energy storage 2, information I3 originating from the electricity generating power plant, and information I4 originating from the network operator.

Means of communication may be advantageously provided for the establishment of communications between the network operator, the power plant, and the means for energy storage 2.

Among the information transmitted, the controller receives information from the network operator, specifically: frequency, voltage, active power demand to be fulfilled for the purposes of frequency control on the network, or the demand for reactive power control capacity. The controller also receives information from the power plant, specifically: the level of the primary reserve capacity available in the power plant and in the KESS.

Using this information, together with information originating from the power plant, the controller manages the level of charging and recharging of the KESS-type means for energy storage 2.

The controller manages energy demand associated with start-up and the auxiliary start-up system, and assumes the control of reactive power in the m.v. network of the power plant.

The controller is also responsible for the operation of the circuit-breaker Disj2, which permits the connection/disconnection of the generator to or from the main network Res.

The first function to be assumed by the means for kinetic energy storage 2 involves the delivery of the primary reserve capacity, as a result of which the turbine must operate, for example, at no more than 95% of its nominal capacity (if not operating as a peak load facility). The reserve capacity must be delivered to the network at the request of the network operator, who will therefore have an energy reserve at their disposal in case of the loss of electricity generating facilities. This reserve capacity therefore contributes to the stability of the network, by maintaining the frequency at a value of the order of 50 Hz or 60 Hz, depending upon the type and characteristics of the network concerned.

In this case, the means for kinetic energy storage will respond more rapidly to the demand of the network operator, thereby limiting any consequential sequence of failures, or extending the response time required for other generators on the network.

The controller must ensure the supply of energy to the network in kWh or MWh by the rapid discharge of the means for kinetic energy storage, equal to the difference between the energy demand called up by the network operator, minus the energy supplied by the generator of the power plant.

Figure 2:
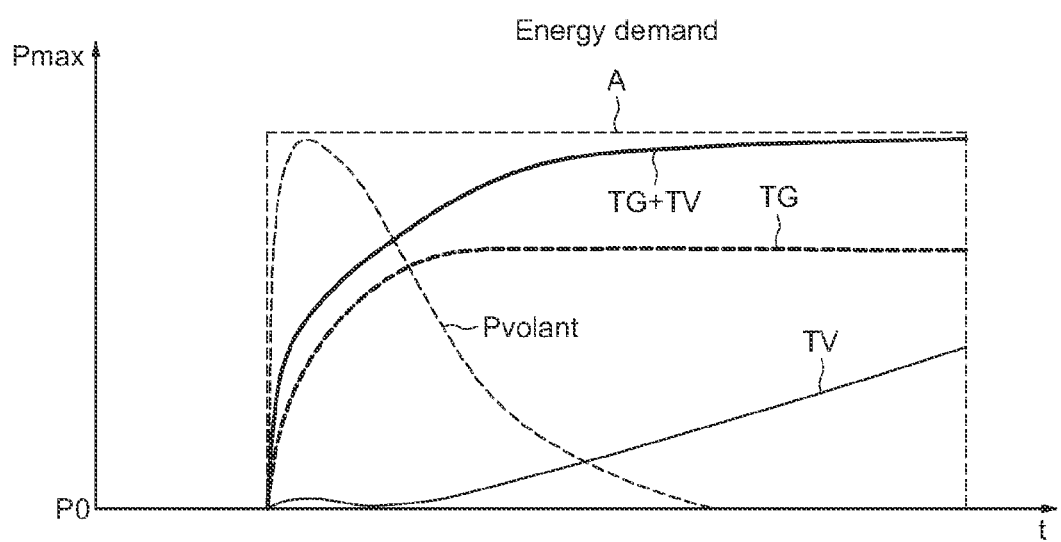
FIG. 2 shows a schematic diagram of the operation of the controller to meet energy demand for the support of frequency control.

From FIG. 2, which illustrates the capacity response characteristic in relation to a setpoint generated by the power plant, and in which the curve TG represents the capacity delivered by a gas turbine, the curve TV represents the capacity delivered by a steam turbine and $P_{volant}$ represents the capacity delivered by the means for energy storage 2, it will be seen that, in all cases, in the absence of the means 2, the capacity run-up ramp of the installation is limited by the capacity run-up ramp of the gas turbine, plus the capacity run-up ramp of the steam turbine. The capacity run-up of a power plant is not only dependent upon the size of the power plant and the type of gas turbine concerned, but is also limited by the inertia of the steam cycle. In large power plants, this ramp may typically be of the order of 10-25 MW per minute, or higher for the latest generation of power plants.

Accordingly, the use of means for energy storage 2 allows the achievement of a short-term and sudden increase in capacity, thereby improving both the capacity run-up ramp of the power plant and its response time, and permitting an accurate response to demand as a result (curve A).

It will be observed that the use of means for kinetic energy storage for the partial fulfillment of this function offers a number of advantages: a rapid response to the call-up of primary reserve capacity; potential for a short-term increase in the operating point of the turbine, on the grounds that the primary reserve capacity can be delivered, whether in whole or in part, by the means for storage; and reduction of peak load operation. Where demand can be fulfilled entirely by the means for storage, this will allow a reduction in maintenance cycles, associated with a reduction in hours of service in overfiring mode, i.e. operation whereby a higher exhaust temperature is authorized, and consequently a higher flame temperature, thereby allowing the base capacity to be increased by 3-7% (depending upon the type of combustion), but at the cost of deterioration of the installation.

Following each response of the controller for the delivery of the primary reserve capacity by the call-up of the means for storage, the controller will initiate the recharging of the said means for storage by generating a command on the circuit-breakers Disj1 for the connection of the means for storage to the network and the supply of power to the motor associated with the said means for storage.

Recharging is completed in the instant following each call-up of the means for storage, using power from the network, or at a time where the network operator requires the absorption of the active power on the network as a means of reducing the network frequency.

However, the means for storage must maintain a minimum level of charge at all times, in case of a sudden drop in the network voltage. This minimum charge is estimated on the basis of the minimum energy to be delivered to all equipment which is susceptible to disturbance as a result of the voltage drop, for a duration of several seconds.

Figure 3:
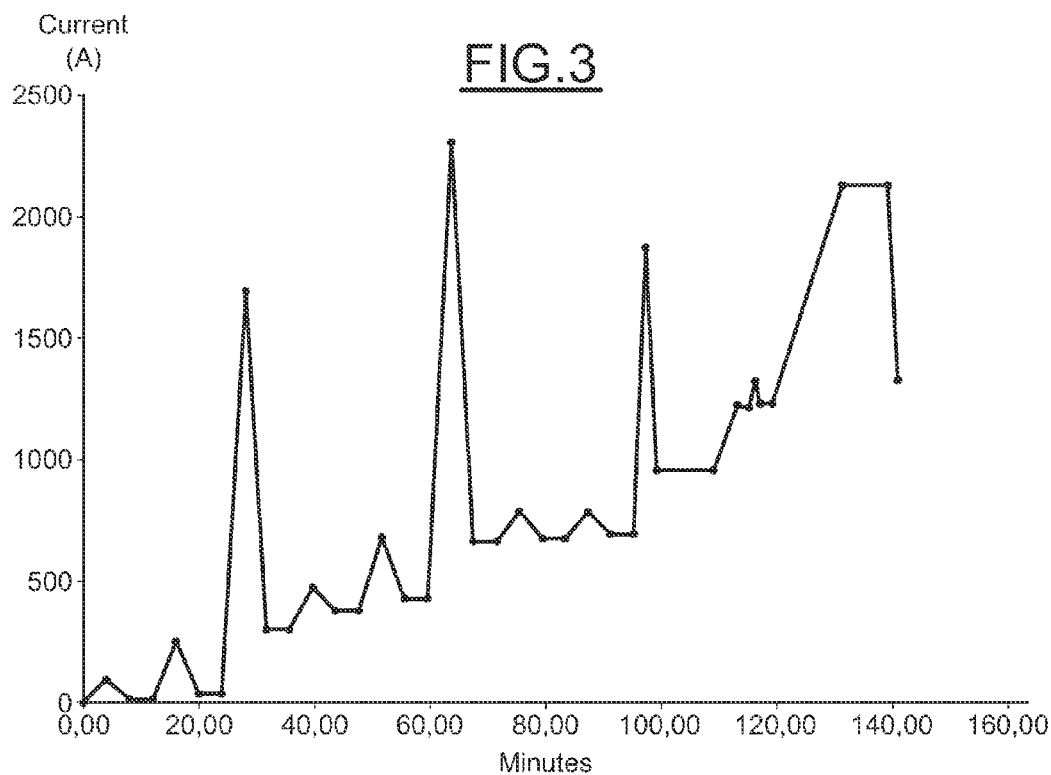
FIG. 3 shows a curve illustrating the sudden rise in current consumption associated with the start-up of the installation.

A further functionality delivered by the controller and the means for storage involves the provision of support for the start-up of the gas turbine. This support permits the re-dimensioning of electricity generating systems required for the delivery of current independently of the network, for the purposes of start-up in case of a blackout. In this case, as shown in FIG. 3, current and capacity demand is characterized by short-term peaks in consumption, each of which corresponds to the start-up of a given device on the installation, for example, a motor-driven circulation pump unit for the lubrication and cooling system, or a load-commutated inverter (LCI), required for the supply of the generator.

In the interests of the stabilization of current demand on standby electricity generator sets, the controller will call up the means for energy storage in order to meet the power demand associated with the start-up of these devices with an enhanced response time. Standby generating facilities may be re-dimensioned accordingly.

Moreover, upon the shutdown of the turbine, the controller actuates the circuit-breakers Disj1 and Disj2, such that the generator will be connected to the means for storage 2. The rise in the speed of rotation of the generator, converted into electricity by the associated motor/generator, is then used to recharge the means for storage 2, such that the latter are fully recharged. The recharging of the means for storage is therefore completed during shutdown phases, using the kinetic energy of the shaft line of the generating unit 1, and simultaneously limiting the overspeed associated with any sudden disconnection of the generator.

Figure 4:
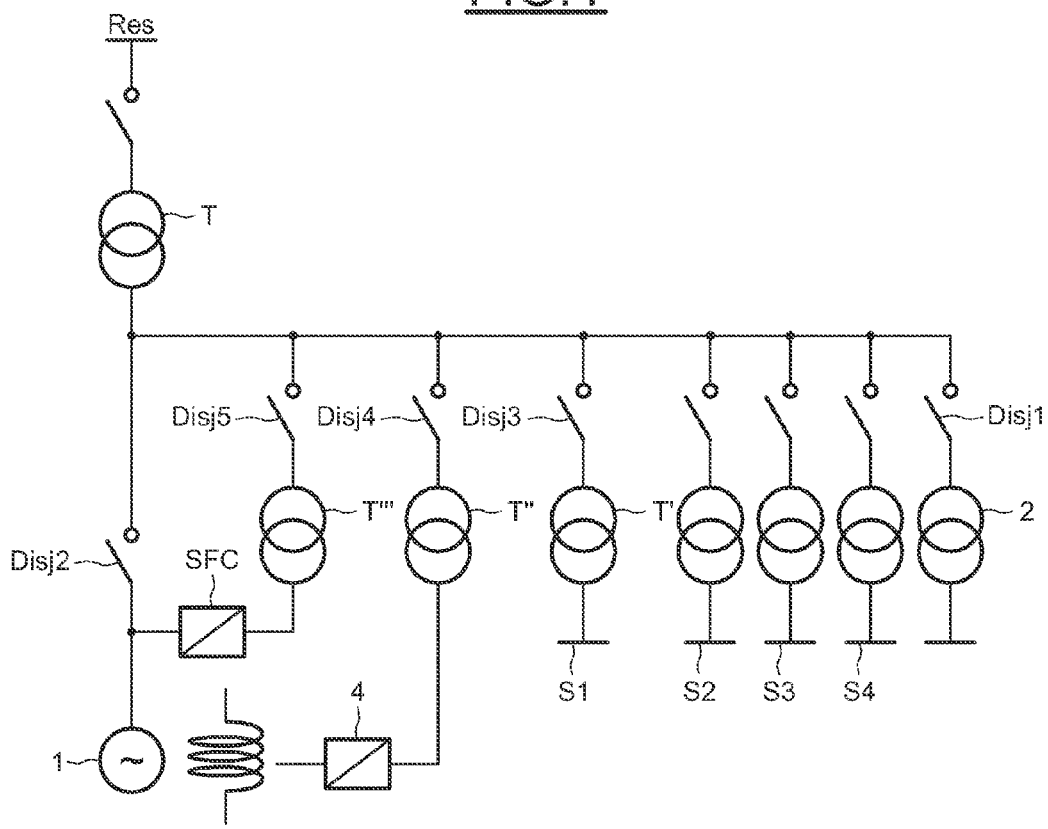
FIG. 4 shows an illustration of another embodiment of an electricity generating installation according to an embodiment of the invention, using additional systems for the production of electricity.

The kinetic energy thus stored may be maintained for an indefinite period, with losses representing only 2% of the rated capacity, using further alternative means for electricity generation in the vicinity of the power plant, e.g. based upon the use of renewables or the use of batteries, or using standby generating facilities such as diesel engines, which are conventionally used for the safe normal shutdown or start-up of the installation. At any time, however, the inertial means for storage 2 may be charged directly from the network, immediately the availability of the latter for the supply of electricity is restored. FIG. 4 represents an installation which is provided with standby means of this type for the generation of electricity.

As will be seen from FIG. 4, which shows the transformer T connected to networks Res via a circuit-breaker Disj2, the generator 1 with its associated electricity generating unit and the means 2 for the storage of electrical energy in the form of kinetic energy, the medium-voltage (m.v.) network is provided with a number of additional energy sources, such as S1, S2, S3 and S4, comprised for example, of systems for the conversion of renewable energy such as solar power, wind power, etc., connected to the m.v. network via transformers, such as T', and via circuit-breakers Disj3 which are also controlled by the controller 3 (not represented in this diagram).

It will be seen that the m.v. network is also provided with a generator exciter 4, associated with a transformer T" and a circuit-breaker Disj4, and with a static frequency converter SFC, also associated with a transformer T'" and a circuit-breaker Disj5.

During the restarting of the gas turbine/steam turbine, or during operation in combined-cycle mode, the inertial means for storage may be used as a support facility for the offsetting of current peaks associated with the start-up of pumps, specifically recirculation pumps, and with the supply of power to load-commutated inverters LCI. Accordingly, the means for storage will permit a reduction in the rated capacity of diesel engines which are conventionally used for turbine restarting, or may even deliver the energy required for the initial moments of start-up, thereby providing sufficient time for the start-up of the said engines and obviating the need for the continuous pre-heating or pre-lubrication thereof.

Accordingly, the storage system permits the smoothing of active power demand. In this case, the controller manages the energy to be delivered within very short periods, thereby permitting a response to all peaks in consumption.

The start-up system of the installation can therefore be dimensioned for compliance with a constant capacity ramp, subject to a limited load demand.

Three criteria may be considered for the dimensioning of the means for energy storage 2. The first consideration may be the elimination of peaks in consumption associated with the start-up of equipment on the installation, as indicated previously with reference to FIG. 3. A second consideration may be the limitation of the maximum unit capacity of the diesel engine system which is conventionally fitted to the installation. Finally, it may be the intention to limit constraints on the standby electric generator set by ensuring a constant increase in the capacity thereof (ramping).

As indicated above, in case of the loss of the network or a blackout, the controller 2 actuates the additional circuit-breaker Disj2 for the disconnection of the generator from the network and the initiation of its shutdown in "safe" mode. The controller will also actuate the circuit-breakers Disj1 for the connection of the generator 1 to the means for energy storage 2.

The sudden increase in speed of the shaft line, converted into electrical energy by the associated motor/generator, is used for the recharging of the means for storage 2. Accordingly, the means for storage may be fully charged within a few seconds, as a result of the inertia associated with overspeed.

This system for the recharging of means for storage is advantageous in relation to conventional systems, such as those based upon the use of diesel engines, as the latter must be constantly pre-lubricated and pre-heated in order to permit the rapid start-up thereof.

These drawbacks are eliminated by the use of a kinetic energy storage system which, in response to a blackout, will be charged and appropriated by the controller for the supply of power to auxiliaries required for the shutdown sequence, which lasts approximately 10 minutes.

Moreover, in case of the failure or unavailability of the standby diesel engine, with which power plants are conventionally equipped for the supply of the requisite electricity for the safe shutdown of equipment, the inertial means for storage 2 may also be called up as a replacement power source for the normal shutdown of the turbine and the supply of essential auxiliaries, such as lubrication and cooling systems, required for the shutdown of the turbine under satisfactory conditions.

The controller may also be capable of detecting a sudden voltage drop on the network to which the electricity generating power plant is connected, below a given threshold value. This may involve e.g. the detection of a voltage drop over a period of at least 2 seconds. In this case, the controller 3 will actuate the circuit-breakers Disj1 and the means for energy storage to ensure the maintenance of a minimum charging capacity on the means for storage 2 required to supply components which are excessively susceptible to voltage drops.

It will also be noted that the present invention proposes a control process for a gas turbine or combined-cycle electricity generating installation which permits the deployment of frequency control or voltage control, under steady-state or transient conditions.

Figure 5:
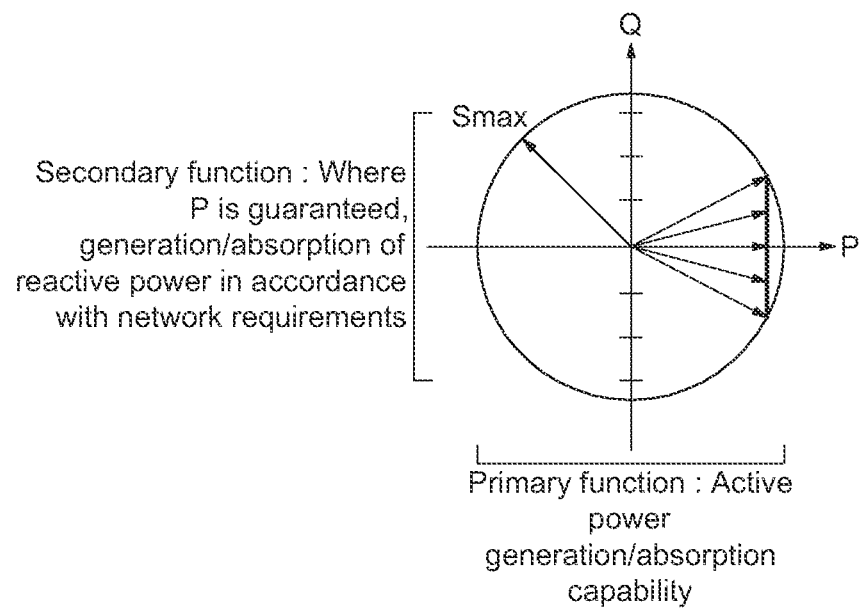
FIG. 5 shows a schematic diagram of an example of frequency and voltage control.

With reference to FIG. 5, the two control functions may be managed in combination by a controller, firstly for the supply of active power or the absorption of active power P by the control of the charging and discharging of the means for energy storage, and secondly, once the level of active power has been secured, for the provision of a secondary function involving the supply or absorption of reactive power Q on the network.

It will be noted that these two types of control functions may be simultaneously optimized by the control system. As an example, the maximum generation/absorption of active power may be limited to approximately 13.4%, thereby permitting the generation of reactive power (inductive or capacitive) up to a value of 50% of the maximum apparent power.

Figure 6:
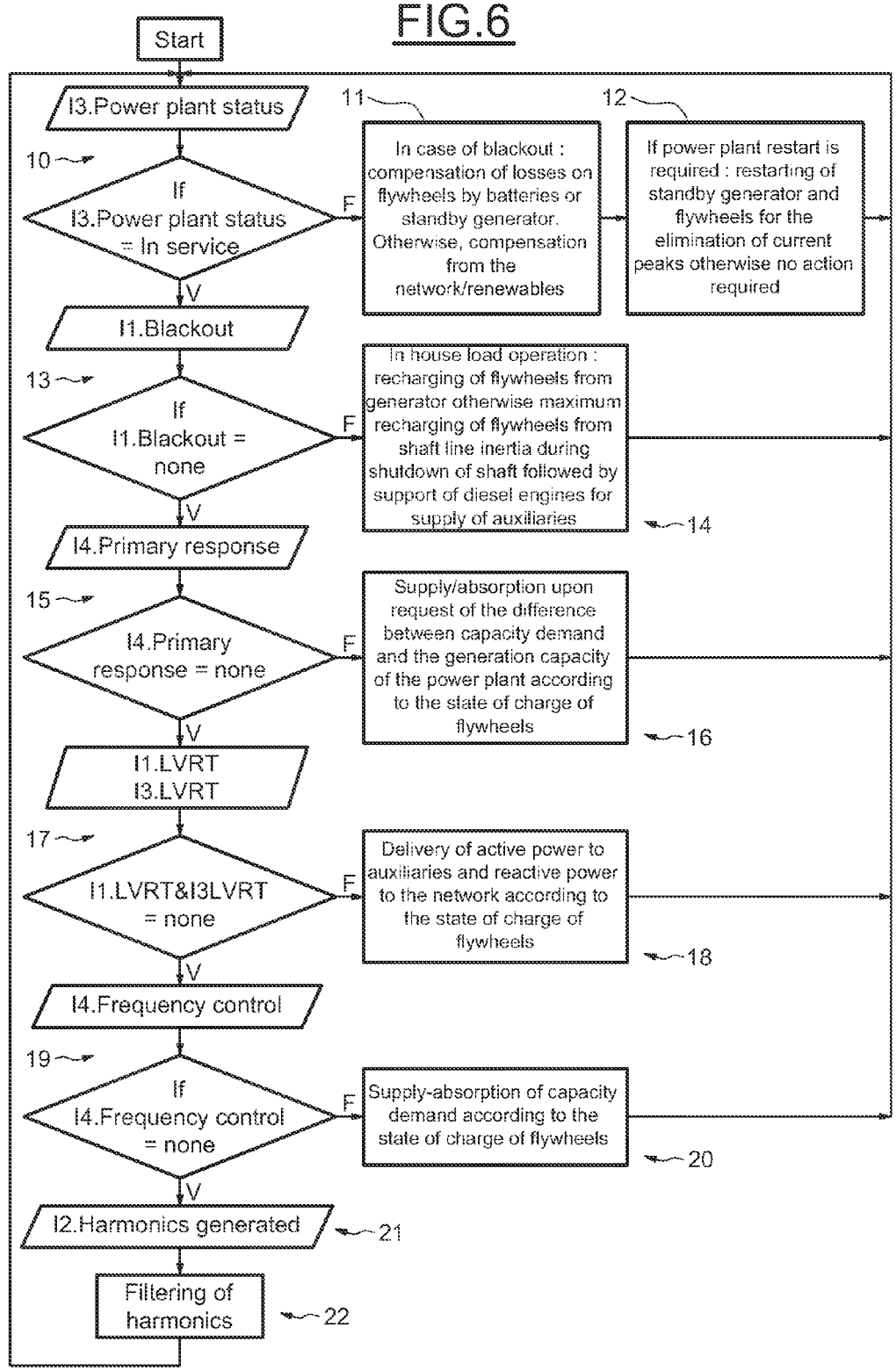
FIG. 6 shows an organigram illustrating the control principle applied by the controller, and the principle applied for the management of storage facilities.

Finally, reference may be made to FIG. 6, which is a schematic representation of the control process deployed by the controller shown in the form of a logic diagram, but not by way of limitation, and which represents the various functions to be delivered according to the information received by the controller, together with the management of means for energy storage, for the charging and discharging of the said means for storage and the connection thereof to the distribution network or the power plant network.

As will be seen from this diagram, there is an initial stage involving the monitoring of the status of the power plant (stage 10), for example, by the checking of the value of a plant-state variable. It will be determined, for example, whether the generator is in service or is shut down. If the generator is shut down, in case of the loss of the network, detected, for example, by the checking of a blackout variable, the energy stored in the means for energy storage is maintained by the use of batteries. Conversely, if the network is maintained in service, the stored energy is maintained by using the network or by using secondary energy sources, such as renewables (stage 11). If the start-up of the installation is required, energy stored in the said means for energy storage will be used for this purpose (stage 12).

If, at the previous stage 10, it has been determined that the power plant is in service, in case of the detection of the loss of the network (stage 13), the means for energy storage will be charged from the generator, in case of the disconnection of the latter, or will otherwise be charged from the diesel engines (stage 14).

In the following stage 15, demand for primary reserve capacity is detected, for example, by the control of a primary service variable. If a primary reserve is called up, a level of capacity will be supplied or absorbed which corresponds to the difference between the capacity demand and the capacity which the power plant is capable of supplying, depending upon the status of the means for energy storage (stage 16). Conversely, in stage 17, an overvoltage will be detected on the network and an overvoltage on the internal network of the power plant (LVRT variable). In case of an overvoltage on the distribution network or on the internal network of the power plant, power will be delivered to auxiliary systems in order to allow the absorption of capacity, and reactive power will be delivered to the network in accordance with the level of charge of the means for energy storage (stage 18).

In the absence of an overvoltage, the requirement for a frequency control function will be detected (stage 19), e.g. by the control of a frequency regulation variable. If this is the case, capacity will be supplied or absorbed in accordance with the requisite frequency control, and according to the state of charge of the means for energy storage (stage 20).

Finally, if no frequency control is required, harmonic values will be generated in the following stage 21, and harmonics will be filtered out (stage 22). The process then returns to the previous stage 10, for the monitoring of the status of the power plant.

What is claimed is:

1. An electricity generating installation comprising:
    an electricity generation unit of a gas turbine, steam turbine or combined-cycle type, wherein the electricity generation unit is coupled to a generator and is connected to a distribution network;
    an energy storage unit configured to store kinetic energy and electrical energy, the energy storage unit being connectable to the distribution network;
    a standby electricity generation unit; and
    a controller configured to manage the operation of the energy storage unit and configured to manage the connection of the energy storage unit to the electricity generation unit and to the network, wherein the controller receives a series of information originating from the network, the energy storage unit, the electricity generation unit and a network operator in order to control the generation of electricity to be delivered to the network and to auxiliary systems of the installation from the energy storage unit.

2. The installation according to claim 1, wherein the controller is configured to regulate the level of primary reserve capacity available in the installation on the basis of the energy available in the energy storage unit.

3. The installation according to claim 1, wherein the controller is configured to control the supply of electricity to the network from the energy storage unit in response to a request by the network operator.

4. The installation according to claim 1, wherein the controller is configured to participate in frequency control on the network at the request of the network operator subject to the energy available in the energy storage unit.

5. The installation according to claim 1, wherein the controller is configured to control the supply of electricity to the auxiliary systems of the installation from the energy storage unit in the case of a voltage drop of a predetermined duration.

6. The installation according to claim 1, wherein the electricity generation unit comprises a generator connected to a gas turbine or a steam turbine, and wherein the controller is configured to initiate charging of the energy storage unit upon shutdown of the electricity generation unit from the inertia of a shaft line in the electricity generation unit.

7. The installation according to claim 1, wherein the controller is configured to regulate the level of at least one of active and reactive power to be delivered to the network from the energy available in the energy storage unit.

8. The installation according to claim 1, wherein the energy storage unit comprises at least one of at least one flywheel connected to a motor, and a series of batteries.

9. The installation according to claim 8, further comprising a series of auxiliary electric power sources connected to associated power electronic components, the associated power electronic components being configured to maintain the rotation of a charged flywheel.

10. The installation according to claim 9, wherein the auxiliary electric power sources are battery power sources or renewable energy power sources.

11. The installation according to claim 1, wherein the energy storage unit comprises power electronic components for the regulation of current, voltage and frequency in the energy storage unit.

12. A control process for an electricity generating installation comprising an electricity generation unit of a gas turbine, steam turbine or combined-cycle type, wherein the electricity generation unit is coupled to a generator and is connected to a distribution network, an energy storage unit, and a controller configured to manage the operation of the energy storage unit, and configured to manage the connection of the energy storage unit to the electricity generation unit and to the network, the process comprising:

receiving a series of information originating from the network, the energy storage unit and the electricity generation unit;

controlling the generation of electricity for delivery to the network and to auxiliary systems of the installation from the energy storage unit based on the series of information;

controlling the energy storage unit for the sequential execution of different functions;

controlling the supply of electricity to the network from the energy storage unit in response to a request from a network operator; and maintaining an optimum state of charge between two functions.

13. The process according to claim 12, further comprising regulating the level of primary reserve capacity available in the installation on the basis of the energy available in the energy storage unit.

14. The process according to claim 12, wherein the energy delivered to the network from the energy storage unit is the difference between the energy demand notified by a network operator and the energy supplied by the electricity generation unit, wherein the energy delivered to the network is limited by the inertia of the gas turbine and the steam turbine.

15. The process according to claim 12, further comprising regulating the network frequency, at the request of a network operator, using the energy available in the energy storage unit.

16. The process according to claim 12, wherein the energy storage unit is charged during a shutdown phase of the electricity generation unit from the inertia of the shaft line in the electricity generation unit.

17. The process according to claim 12, wherein the energy storage unit is configured to support the start-up of the installation and to limit current demand on the network.

18. The process according to claim 12, wherein the energy storage unit is configured to support the shutdown of the electricity generation unit by delivering energy to the auxiliary systems of the installation.

19. The process according to claim 12, further comprising detecting a voltage drop in the network, and delivering energy to the auxiliary systems of the installation from the energy storage unit in response to a detected voltage drop.

20. The process according to claim 19, further comprising delivering energy to maintain voltage in the network, wherein energy is delivered to the auxiliary systems of the installation from the energy storage unit in response to a detected voltage drop in the network of a predetermined duration.

21. The process according to claim 12, further comprising regulating at least one of the level of active and reactive power to be delivered to the network from the energy available in the energy storage unit.

* * * * *